United States Patent
Vaidya

(10) Patent No.: US 6,822,974 B1
(45) Date of Patent: Nov. 23, 2004

(54) METHOD AND SYSTEM FOR PACKET TIMING ADJUSTMENT BASED ON APPROXIMATED PACKET TRANSMISSION TIME IN A MOBILE RADIO COMMUNICATION SYSTEM

(75) Inventor: Samir Vaidya, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 968 days.

(21) Appl. No.: 09/710,321

(22) Filed: Nov. 9, 2000

(51) Int. Cl.[7] .......................... H04L 12/28; H04B 7/212; H04J 3/06
(52) U.S. Cl. .......................... 370/512; 370/401; 370/442
(58) Field of Search .................................. 370/328, 338, 370/355, 401, 442, 231, 471, 503, 512; 455/422.1

(56) References Cited

U.S. PATENT DOCUMENTS 5,898,696 A * 4/1999 Proctor et al. .............. 370/468
6,018,532 A * 1/2000 Nilsson et al. .............. 370/535
6,738,374 B1 * 5/2004 Olkkonen et al. .......... 370/389

* cited by examiner

*Primary Examiner*—Duc Ho

(57) ABSTRACT

A mobile radio system (10) includes a timing detector (20) and a timing adjuster (22) to adjust the timing of packets transferred between a transcoder (14) and a base radio site (12). The timing detector (20), including in the base radio site (12), determines whether outbound packets are received within a packet hold time. If packets arrive outside the hold time, a timing adjustment value is generated and transferred to the timing adjuster (22). The timing adjuster (22) adjusts the times at which the transcoder (14) transfers subsequent ones of the packets to the base radio site (12) so that they arrive within the hold time.

17 Claims, 3 Drawing Sheets

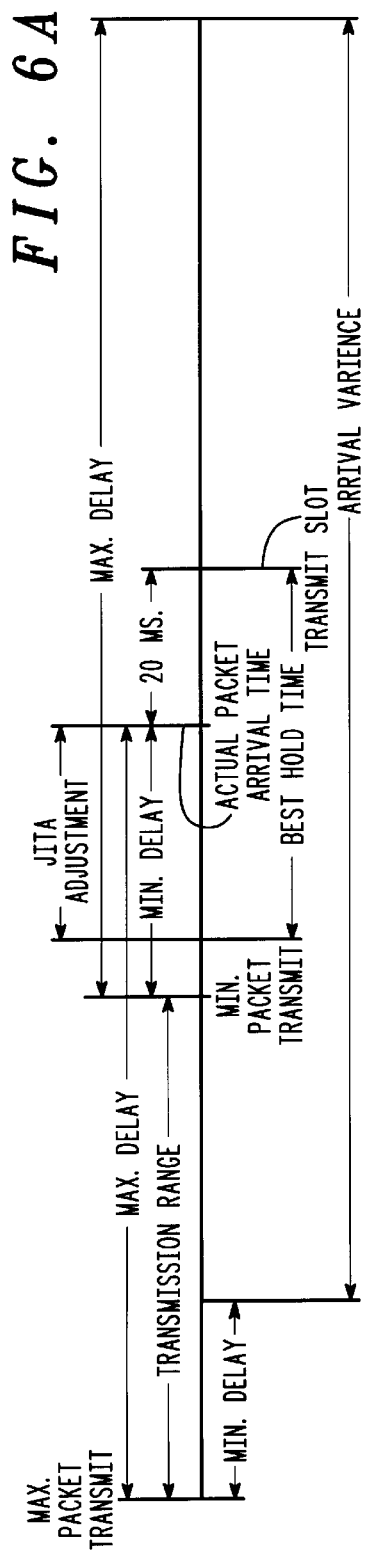
FIG. 6A
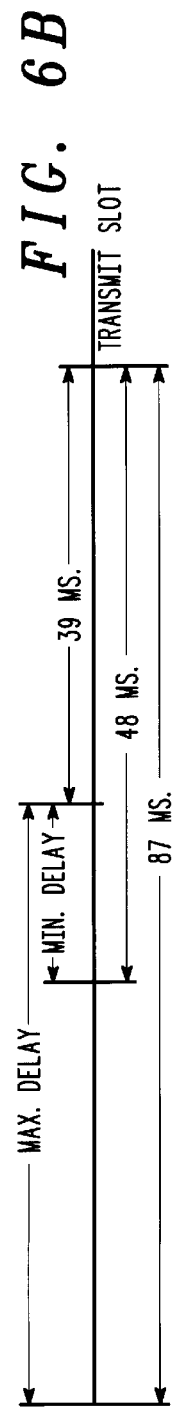
FIG. 6B
FIG. 7
| CHANNEL TYPE | BYPASS | SOURCED DIRECTION | PACKET QUALIFIER |
|---|---|---|---|
| RF SLOT | | SPACE SLOT | RESERVED |
| MITIGATION | RESERVED | | |
| JITA ADJUSTMENT REQUEST | | | APPEND |
70

METHOD AND SYSTEM FOR PACKET TIMING ADJUSTMENT BASED ON APPROXIMATED PACKET TRANSMISSION TIME IN A MOBILE RADIO COMMUNICATION SYSTEM

TECHNICAL FIELD OF THE INVENTION

The present invention generally relates to mobile radio communication systems, and in particular, to timing adjustments for packets transferred in a mobile radio communication system.

BACKGROUND OF THE INVENTION

Mobile radio systems for providing interconnect services are well known in the art. Generally, interconnect services provide an interface to the public switch telephone network (PSTN) so that mobile radio subscribers can place and receive calls to and from conventional telephones. To support interconnect services, mobile radio systems typically include one or more transcoders (XCDRs) that convert pulse code modulated (PCM) traffic from the PSTN into a format suitable for transmission over a radio network, such as vector sum excited linear prediction (VSELP) format.

A problem with current mobile radio communication systems is that the transcoder output is not always synchronized with the operation of the base radio sites (BRSs) of the radio network. This can result in the loss of transmission packets, causing a degradation in audio and data quality. Moreover, the communication path delay between the XCDR and the BRS is not always constant, this variable delay can also result in further degradation of service quality. Accordingly, there is a need for a method and system of adaptively synchronizing packet transmissions between XCDRs and BRSs in mobile radio communication systems.

BRIEF DESCRIPTION OF THE DRAWINGS

FIGS. 6a–b show exemplary timelines illustrating the process of approximating packet transmission times; and FIG. 7 illustrates a message format diagram depicting an exemplary inbound packet header for transferring timing adjustment information between the BRC and the XCDR.

DETAILED DESCRIPTION OF THE PRESENTLY PREFERRED EMBODIMENTS

Figure 1:
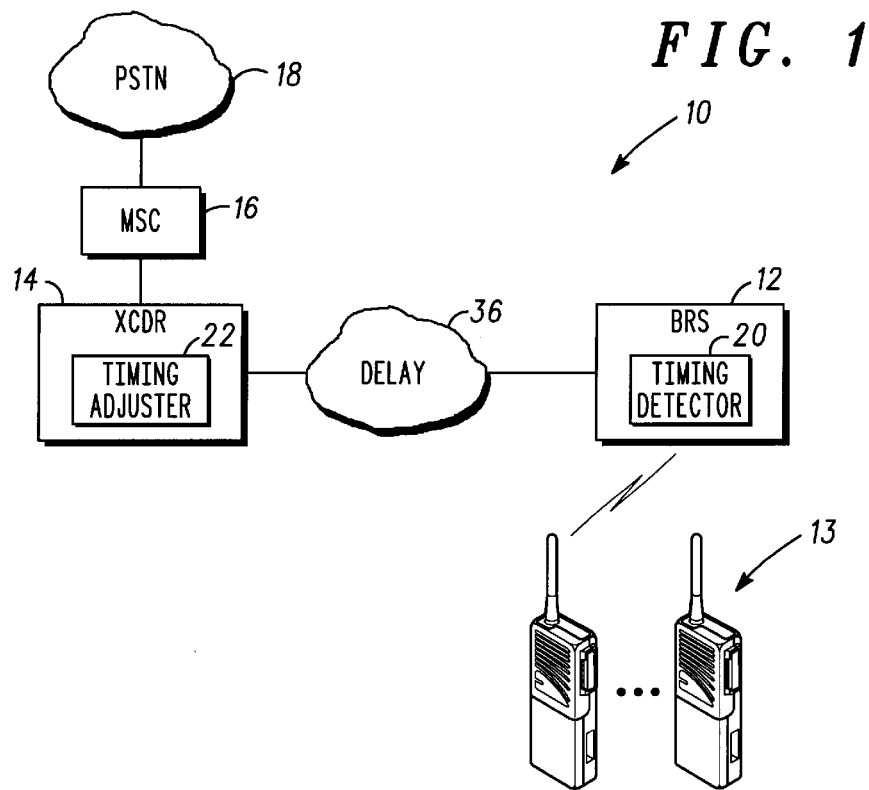
FIG. 1 is a block diagram illustrating a mobile radio communication system in accordance with an embodiment of the present invention.

Turning now to the drawings and in particular to FIG. 1, there is illustrated an exemplary mobile radio communication system can in accordance with an embodiment of the present invention. The system 10 includes a base radio site (BRS) 12, a transcoder (XCDR) 14, a plurality of mobile subscriber units (MSUs) 13, and a mobile switching center (MSC) 16 for interfacing to the public switch telephone network (PSTN) 18. The system 10 can be implemented using the Microlite radio communication system available from Motorola, Inc., with the Microlite XCDR being modified to include a timing adjuster 22 and a at least one BRS being modified to include a timing detector 20, as disclosed herein.

The timing adjuster 22 and the timing detector 20 operate together to provide a system for iteratively approximating the transmission timing of outbound packets from the XCDR 14. By estimating the transmission output timing of the XCDR 14, its output timing can be adjusted to reduce packet loss and the need for packet buffering.

The MSC 16, XCDR 14, and BRS 12 are configured to provide interconnect services to the MSUs 13. The XCDR 14 converts outbound pulse code modulated (PCM) traffic from the MSC 16 into a data format transferable by the BRS 12 to the MSUs 13, such as VSELP, and also converts inbound VSELP traffic into the PCM format. The XCDR 14 and the BRS 12 communicate by way of a communication link 15. Preferably, the communication link 15 employs a conventional frame relay protocol to transfer information between the XCDR 14 and the BRS 12. The information can be mixed-traffic, including voice, data, and control. A variable path delay 36 is introduced by the communication link 15 between the XCDR 14 and BRS 12. The delay can be caused by various sources, including router delays and network delays. The amount of delay can also depend on the number of DS0s and interleaves between the XCDR 14 and the BRS 12. Generally, for a 3:1 VSELP voice system, the arrival time at the BRS 12 caused by the delay 36 can vary by +/−39 mS. For a 6:1 VSELP voice system, the delay variance at the BRS 12 can be +/−65 mS.

The timing detector 20 and the timing adjuster 22 provide just in time audio (JITA) adjustments to synchronize packet transmissions from the XCDR 14 to the BRS 12, and to compensate for the variable path delay introduced by the communication link 15. With variable delays of sizes as discussed above, JITA algorithm can result in packets missing their timeslots and hence being buffered at the BRS 12 for too long, or even being dropped. For JITA to work properly, the BRS 12 should adaptively determine when the XCDR 14 transmitted a packet and cause the transmission time to adjust accordingly.

The transcoder 14 may be, for example, a commercially-available transcoder from Motorola, Inc., configured to include the functionality of the timing adjuster 22 as described herein.

The BRS 12 may be an iDEN enhanced based transceiver station (EBTS), available from Motorola, Inc., configured to include the timing detector 20 as described herein.

The timing adjuster 22 and timing detector 20 can be software programs residing on the XCDR 14 and BRS 12, respectively.

Figure 2:
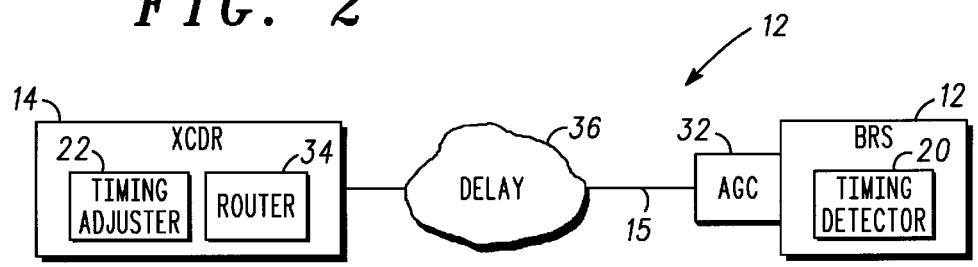
FIG. 2 is a block diagram illustrating details of the XCDR and BRS shown in FIG. 1.

FIG. 2 is a block diagram illustrating details of the BRS 12 and the XCDR 14. The BRS 12 can include a base radio controller (BRC) 30 and an access control gateway (ACG) 32. The BRC 30 is software configurable to include the functionality of the timing detector (TD) 20. The ACG 32 and BRC 30 can communicate by way of an Ethernet link. An ACG and software-configurable BRC suitable for implementing the timing detector 20 are available from Motorola, Inc.

The XCDR 14 can include a conventional frame relay router 34 for transmitting frame relay packets over the communication link 15.

Figure 3:
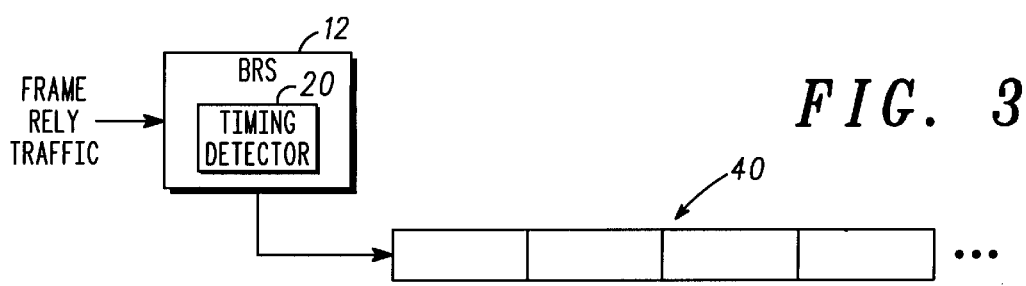
FIG. 3 is a block diagram illustrating packet traffic flow through the base radio controller (BRC) shown in FIG. 2.

FIG. 3 illustrates the packet flow through the BRC 30. The BRC 30 receives frame relay traffic from the XCDR 14, by way of the ACG 32. Information contained in the frame relay packets is output from the BRC 30 as a sequence of transmission slots 40, which are then received by the mobile subscriber units 13 by way of a radio link. The transmission slots 40 are output by the BRC 30 at regular intervals.

Figure 4:
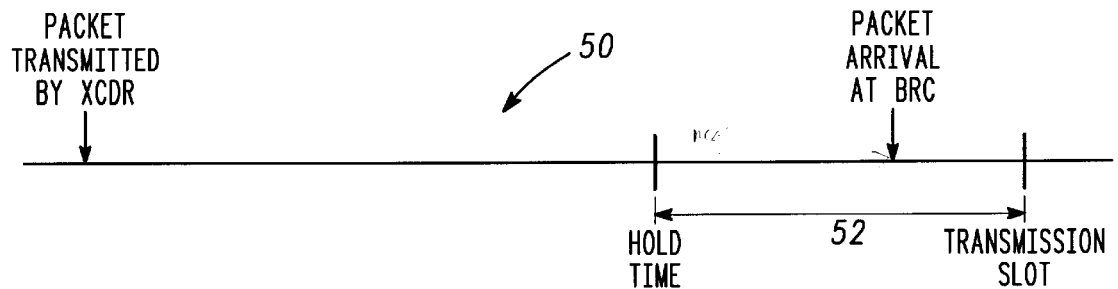
FIG. 4 is an exemplary timeline showing the timing of an outbound packet transmitted by the XCDR to the BRC.

FIG. 4 shows a timeline 50 illustrating the timing of a packet transmitted from the XCDR 14 to the BRC 30. As illustrated, the hold time defines a time period 52 immediately preceding a transmission slot. The time period 52 defines when a packet from the XCDR 14 can be properly received and retransmitted to the MSUs by the BRC 30. Packets arriving at the BRC 30 outside of the time period 52 may be dropped, resulting in an audio mute, or may require buffering before being retransmitted by the BRC. Since the delay 36 is variable, it is necessary to periodically adjust the packet transmission timing of the XCDR 14.

Figure 5:
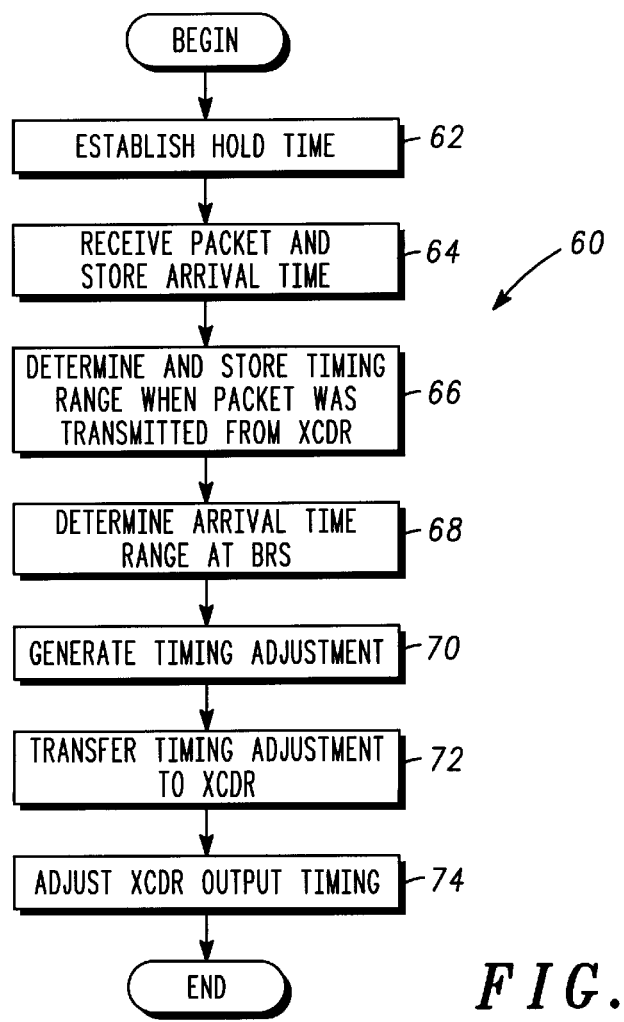
FIG. 5 is a flow chart diagram illustrating a method of adjusting packet timing in accordance with a further embodiment of the present invention.

FIG. 5 is a flow chart diagram 60 illustrating a method of adjusting packet timing for packet output from the XCDR 14 to the BRS 12. Essentially, the packet timing is adjusted by determining the range of possible arrival times at the BRC 30 and then adjusting the XCDR transmission time to narrow the possible range for subsequently transmitted packets. This process of adjustment, which is depicted in the method steps 62–74, can be repeated for outbound packets to successively narrow the range of arrival times at the BRC 30.

In step 62, the timing detector 20 establishes an optimum hold time. The optimum hold time can represent the optimum time at which packets should arrive at the BRS and can be based on the number of DSO's and interleaves between the XCDR and the BRS 12.

The BRS 12 then awaits for the arrival of a frame relay packet from the XCDR 14. Upon arrival of a frame relay packet, the BRS 12 stores the time at which the packet arrives at the BRS 12.

In step 66, the timing detector 20 determines and stores the timing range defining the possible times at which the packet was transmitted from the XCDR 14. This is illustrated by the time line shown in FIG. 6a.

Next, in step 68, the BRS 12 determines the range of possible arrival times (arrival variance) at the BRS 12, based on the range of transmission times from the XCDR 14. This is also illustrated in FIG. 6a.

The timing detector 20 determines a timing adjustment value by determining the difference between the optimum hold time and the actual arrival time of the packet (Step 70). If the data packet arrives outside of the hold time period, the timing detector 20 transfers the timing adjustment to the timing adjuster 22 included in the XCDR 14 (Step 72). The timing adjustment value may indicate a negative adjustment, which means that the XCDR 14 should transmit the outbound packets earlier because they are arriving late at the BRS 12, after the hold period. The timing adjustment value may also indicate that a positive adjustment is needed; specifically, that the XCDR 14 should transmit outbound packets later because they are arriving too early at the BRS 12. The timing adjustment value in the header can be updated every fourth inbound packet for 3:1 VSELP voice and every eighth inbound packet for 6:1 VSELP voice.

After receiving the timing adjustment value from the BRS 12, the timing adjuster 22 configures the XCDR 14 to transfer subsequent ones of the packets at a revised time, based on the timing adjustment value (Step 74). Typically, only one negative adjustment is necessary at the beginning of a transmission session between the XCDR 14 and BRS 12. Later adjustments during the session are usually positive adjustments.

For illustration purposes, consider a 3:1 system with 1 DSO and 6 interleaves. The timelines for this scenario are shown in FIGS. 6a–b.

For the 3:1 system packet arrival can vary between +/−39 ms from a reference arrival time. To avoid any packets being dropped the best arrival time would be 39 ms (Best_Hold_Time) before a transmission slot.

If the first packet arrives at the BRC 20 ms (Hold_Time) before the transmission slot, it would mean that the XCDR could have transmitted the packet 68 ms (=Hold_Time+max delay) to 29 ms (=Hold_Time+min delay) before the transmission slot and could have arrived at the BRC between 59 ms before the transmission slot to 19 ms after the transmission slot. To make sure that future packets are not dropped, it is necessary to buffer two packets and make a reverse JITA adjustment (of Hold_Time−Best_Hold_Time=20−39=−19 ms) so that packets arrive 45 to 5 ms before the transmission slot. If the next packet were to experience the same delay as the packet that prompted the JITA adjustment, the packet would arrive 39 ms (Best_Hold_Time) before the transmission slot. If the packet did not experience the same delay it could arrive anywhere between 67 ms to 0 ms before a transmission slot. If the packet arrives anywhere between 67 ms to 45 ms before the transmission slot, it may be necessary to buffer two packets.

The aim of the BRC 30 is to get all packets to arrive anywhere between 0 ms to 39 ms before the transmission slot. This would mean that the best time for the XCDR to be transmitting is:

XCDR tx time=(Best_Hold_Time+min delay) ms before tx slot.

If a packet arrives 39 ms (Best_Hold_Time) before a slot, this could mean that the XCDR transmitted it anywhere between (39+max delay) ms to (39+min delay) ms before the transmission slot. In the case of 3:1, with 1 DSO's and 6 interleaves these values would translate to 87 ms (Worstcase_XCDR) to 48 ms (Bestcase_XCDR) before the transmission slot.

After making the first JITA adjustment, the next voice packet is expected to arrive 39 ms before the transmission slot, however, if it does not, the possible range of XCDR transmission times of that particular packet and then make another JITA adjustment so that the range gets closer to the best transmission time.

For example, after making the first JITA adjustment, instead of arriving 39 ms before the next transmission slot, the next packet arrives 30 ms (Hold_Time) before the next transmission slot. This would mean that the XCDR transmitted the packet 78 ms (Hold_Time+max delay) to 48 ms (Bestcase_XCDR) before the transmission slot. This means that potential arrival times have now been changed between 69 ms to 0 ms before the next transmission slot from the previous value of 78 ms and 0 ms before the next transmission slot. This shows that the arrival time range has dropped by 9 ms. Since the Hold_Time was less than the Best_Hold_Time, another JITA adjustment is not issued.

However, if the packet that arrived at the BRC 30 after the first JITA adjustment request was made, arrived 50 ms (Hold_Time) before the next transmission slot, this would mean that it was transmitted by the XCDR: anywhere between 88 ms (Worstcase_XCDR) to 59 ms (Hold_Time+min delay) before the transmission slot. The potential arrival times of the packet at the BRC are then anywhere from 79 ms to 11 ms (Hold_Time−Best_Hold_Time) because we want packets to arrive 39 ms before the transmission slot. The XCDR packet transmission times after the JITA adjustment is made from 77 ms (Worstcase_XCDR-JITA) to 48 ms (Bestcase_XCDR) before the next transmission slot. This makes arrival times at the BRC 30 to be from 68 ms to 0 ms before the next transmission slot.

This method will allow the BRC 30 to keep making forward JITA adjustments until voice packets are only arriving in the range of 39 ms to 0 ms before the transmission slot. This would mean that the XCDR was transmitting the packets 48 ms before the transmission slot. This will ensure that no packets are dropped and also that only one packet would need to be buffered at anytime.

FIG. 7 illustrates an exemplary inbound packet header format 70 that includes the timing adjustment value generated by the timing detector 20 of the BRS 12. The packet is transferred from the BRS 12 to the XCDR 14. The header 70 illustrates the fields included in a high-level data link control (HDLC) packet header usable with the frame relay protocol.

The timing adjustment value can be included in the JITA adjustment request field. The timing adjustment can include a binary value interpreted as a 2's complement value. The 2's complement format permits positive and negative adjustments. The field can be indexed into a commonly defined look-up table stored in both the timing detector 20 and the timing adjustor 22. Millisecond resolution can be provided by the look-up tables of the timing detector 20 and timing adjustor 22.

The other fields included in the packet header 70 includes a channel type field, which specifies the type of data in the packet payload. The packet payload can carry 6:1 VSELP voice, 3:1 VSELP voice, data, or control information. A bypass field describes the state of the XCDR 14, namely whether the XCDR 14 is in a Vocoder or bypass state; a sourced direction field describes whether the message is an inbound or outbound message, i.e., whether it is being transferred from an MSU handset or to an MSU handset, respectively; a packet qualifier field that identifies the type of packet, an RF slot field that defines the RF slot number that the packet came from; a mitigation field; and an append field for use with header extensions.

While specific embodiments of the present invention have been shown and described, it will apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

I claim:

1. In a radio communication system, a method of adjusting packet timing for a plurality of packets from a transcoder (XCDR) to a base radio site (BRS), comprising:

establishing predetermined hold time immediately preceding an outbound time slot of the BRS;

generating a timing adjustment in response to one of the packets arriving at the BRS outside the predetermined hold time;

transferring the timing adjustment to the XCDR; and adjusting the times at which the XCDR transfers subsequent ones of the packets to the BRS based on the timing adjustment.

2. The method of claim 1, wherein the timing adjustment is the time period between the beginning of the predetermined hold time and an arrival time of the packet.

3. The method of claim 1, wherein the packets are voice packets.

4. The method of claim 1, further comprising:

including the timing adjustment in an outbound frame relay header.

5. The method of claim 1, further comprising:

receiving an initial packet at the BRS during the predetermined hold time;

generating a negative timing adjustment in response to the initial data packet;

transferring the negative timing adjustment to the XCDR; and adjusting the times at which the XCDR transfers the subsequent ones of the packets based on the negative timing adjustment.

6. The method of claim 5, wherein the negative timing adjustment is the time period between the beginning of the predetermined hold time and an arrival time of the initial data packet the BRS.

7. A radio communication system, comprising:

a transcoder (XCDR) for outputting a plurality of packets, each packet being output at a predetermined interval;

a base radio site (BRS) for outputting a plurality of time slots for carrying information included in the packets; and a communication link for transferring the packets between the XCDR and the BRS, the communication link causing a variable delay in transferring the packets from the XCDR to the BRS;

wherein the BRS is capable of generating a timing adjustment in response to receiving at least one of the packets outside a predetermined hold time corresponding to at least one of the transmission slots, the BRS transferring the timing adjustment to the XCDR;

wherein the XCDR is capable of adjusting the output timing of at least one of the plurality of packets based on the timing adjustment.

8. The radio communication system of claim 7, wherein the BRS is configured to establish the predetermined hold time for the time slots.

9. The radio communication system of claim 7, wherein the communication link operates according to a frame relay protocol.

10. The radio communication system of claim 7, wherein the link carries mixed-traffic.

11. The radio communication system of claim 7, wherein the packets are voice packets.

12. The radio communication system of claim 7, wherein the variable delay is caused entirely by the communication link.

13. The radio communication system of claim 7, further comprising a mobile switching center (MSC), operatively coupled to the XCDR.

14. The radio communication system of claim 7, wherein the BRS includes an ACG.

15. The radio communication system of claim 7, further comprising a plurality of mobile units capable of communication with the BRS by way of a radio link.

16. A radio communication system for providing services to a plurality of mobile units, comprising:

a transcoder for outputting a plurality of packets representing voice traffic of an interconnect call, and the transcoder including means for adjusting the output timing of the packets; and a base radio site, operatively coupled to the transcoder, for outputting a plurality of transmission slots for carrying the voice traffic, the base radio site including means for generating a timing adjustment in response to receiving at least one of the packets outside a predetermined hold time corresponding to at least one of the transmission slots, and including means for transferring the timing adjustment to the adjusting means of the transcoder.

17. The radio communication system of claim 16, wherein each of the packets is output by the transcoder at a regular interval.

* * * * *